United States Patent
Chilton

(10) Patent No.: US 7,073,024 B1
(45) Date of Patent: Jul. 4, 2006

(54) DATA PROTECTION METHOD WHEREIN DATA PROTECTION CODE IS STORED TOGETHER WITH PARITY

(75) Inventor: Kendell A. Chilton, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 345 days.

(21) Appl. No.: 10/675,041

(22) Filed: Sep. 30, 2003

(51) Int. Cl.
*G06F 12/00* (2006.01)

(52) U.S. Cl. .................. 711/114; 711/133; 711/118
(58) Field of Classification Search ............... None
See application file for complete search history.

(56) References Cited

U.S. PATENT DOCUMENTS

| | | | | |
|---|---|---|---|---|
| 5,596,708 A | * | 1/1997 | Weber ............... | 714/6 |
| 5,719,885 A | * | 2/1998 | Ofer et al. ......... | 714/6 |
| 5,734,815 A | * | 3/1998 | Schatzberg ........ | 714/6 |
| 6,061,822 A | * | 5/2000 | Meyer .............. | 714/758 |
| 6,304,992 B1 | * | 10/2001 | Cypher ............. | 714/757 |
| 6,760,814 B1 | * | 7/2004 | Corrigan .......... | 711/133 |
| 6,772,289 B1 | * | 8/2004 | Corrigan .......... | 711/118 |
| 6,901,551 B1 | * | 5/2005 | Corrigan, III ...... | 714/763 |
| 6,981,171 B1 | * | 12/2005 | Hashemi ........... | 714/5 |
| 2002/0161972 A1 | * | 10/2002 | Talagala et al. ... | 711/114 |

* cited by examiner

*Primary Examiner*—Mano Padmanabhan
*Assistant Examiner*—Duc T Doan

(57) ABSTRACT

A method for storing data on a disk drive and checking the validity of data read from such disk drive. The method includes: transmitting the data from a source thereof for storage in the disk drive through a first transmission path and transmitting a CRC together with parity associated with such data for storage in a storage medium through a second path separate from the disk drive. The data stored on the disk drive is retrieved. A CRC associated with the retrieved data is determined. The determined CRC and the CRC stored in the storage medium are compared. With such method, if data and ins associated CRC are written into the incorrect location in the disk drive, during a read an error will be detected because the CRC of the read data will not match the CRC associated with the read data stored on the storage medium.

12 Claims, 6 Drawing Sheets

DATA PROTECTION METHOD WHEREIN DATA PROTECTION CODE IS STORED TOGETHER WITH PARITY

TECHNICAL FIELD

This invention relates generally to data protection methods and more particularly to methods for protecting data using Cyclic Redundancy Codes (CRCs).

BACKGROUND

As is known in the art, on form of data protection is to append to each block of data a CRC. As is known, a CRC is derived from, and stored or transmitted with, a block of data in order to detect corruption. By recalculating the CRC and comparing it to the value originally transmitted, the receiver can detect some types of transmission errors.

As is also known in the art, one type of data storage system is a RAID system. One type of such RAID system stores data on disk drives. One such RAID system includes a separate disk drive to store parity bits. Also, in one type of RAID system the data is stored in stripes. More particularly, a plurality of disk drives is provided. When a plurality of blocks of data is to be stored, each one of the blocks of data is stored in a corresponding one of the plurality of disk drives as shown in FIG. 1A. Thus, in this example, there are four blocks of data, D0–D3. During a write, blocks of data D0–D3 become stored in disk drives DD0–DD3, respectively. Further the blocks of data D0–D3 are XORd to compute a party bit which is stored in a parity disk drive DD_Parity, as shown. It is noted that when the blocks of data D0–D3 are transmitted to disk drives DD0–DD3, respectively, the corresponding one of a plurality of directors Director 0–Director 3 first receives the block of data D0–D3, respectively, transmitted thereto along with a CRC; i.e., CRC0–CRC3, respectively, associated with each one of the blocks of data D0–D3. Thus, considering for example Director 0, such Director 0 receives data block D0 along with its associated CRC, i.e., CRC0. In like manner Directors 1–Director 3 receive data blocks D1–D3, respectively, and CRC1–CRC3, respectively. The directors then calculates the CRC of the block of data it receives and compares it with the CRC sent to it from the data source, here, for example, a semiconductor memory. If the calculated CRC matches the transmitted CRC, the data is transmitted by the director to its corresponding disk drive along with the CRC.

During a read, as shown in FIG. 1B, the blocks of data are read from the disk drives. The directors calculate the CRC from the read data block it receives and compares it with the CRC read from the disk drive. If they match the data block is transmitted to the memory. Also sent to the memory is the parity bit of the data blocks D0–D3 stored in the parity disk drive DD_PARITY.

SUMMARY

In accordance with the present invention, a method is provided for storing data and checking the validity of stored data when such stored data is read. The method includes: transmitting the data from a source thereof for storage in a first storage device and transmitting a CRC associated with such data for storage in a second, different storage device; retrieving the data stored in the first storage device; determining a CRC associated with the retrieved data; and comparing the determined CRC with the CRC stored in the second storage device.

With such method, if data and its associated CRC are written into the incorrect location in the disk drive, during a read an error will be detected because the CRC of the read data will not match the CRC associated with the read data stored on the storage medium.

In one embodiment, the first storage device is a disk drive.

In accordance with another feature of the invention, a method is provided for storing data on a disk drive and checking the validity of data read from such disk drive, comprising: transmitting the data from a source thereof for storage in the disk drive and transmitting a CRC associated with such data for storage in a different disk drive; retrieving the data stored on the disk drive; determining a CRC associated with the retrieved data; and comparing the determined CRC with the CRC stored in the second disk drive.

In accordance another feature of the present invention, a method is provided for storing data on a disk drive and checking the validity of data read from such disk drive. The method includes: transmitting the data from a source thereof for storage in the disk drive through a first transmission path and transmitting a CRC associated with such data for storage in a storage medium through a second path separate from the disk drive. The data stored on the disk drive is retrieved. A CRC associated with the retrieved data is determined. The determined CRC and the CRC stored in the storage medium are compared.

In one embodiment, the storage medium is a second disk drive.

In one embodiment, the second disk drive is a parity disk drive for storing a parity of the data transmitted by the source to the disk drive.

In accordance with another feature of the invention, a method is provided for storing a plurality of blocks of data on a corresponding one of a plurality of disk and checking the validity of plurality of blocks of data read from such disk drives. The method includes: transmitting the blocks of data from a source thereof for storage in the disk drives through a plurality of different transmission paths and transmitting CRCs associated with each one of the blocks of data for storage in a storage medium through a path separate the plurality of different transmission paths; retrieving the blocks of data stored in the disk drives; determining CRCs associated with the blocks of retrieved data; and, comparing the determined CRCs with the CRCs stored on the storage medium.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
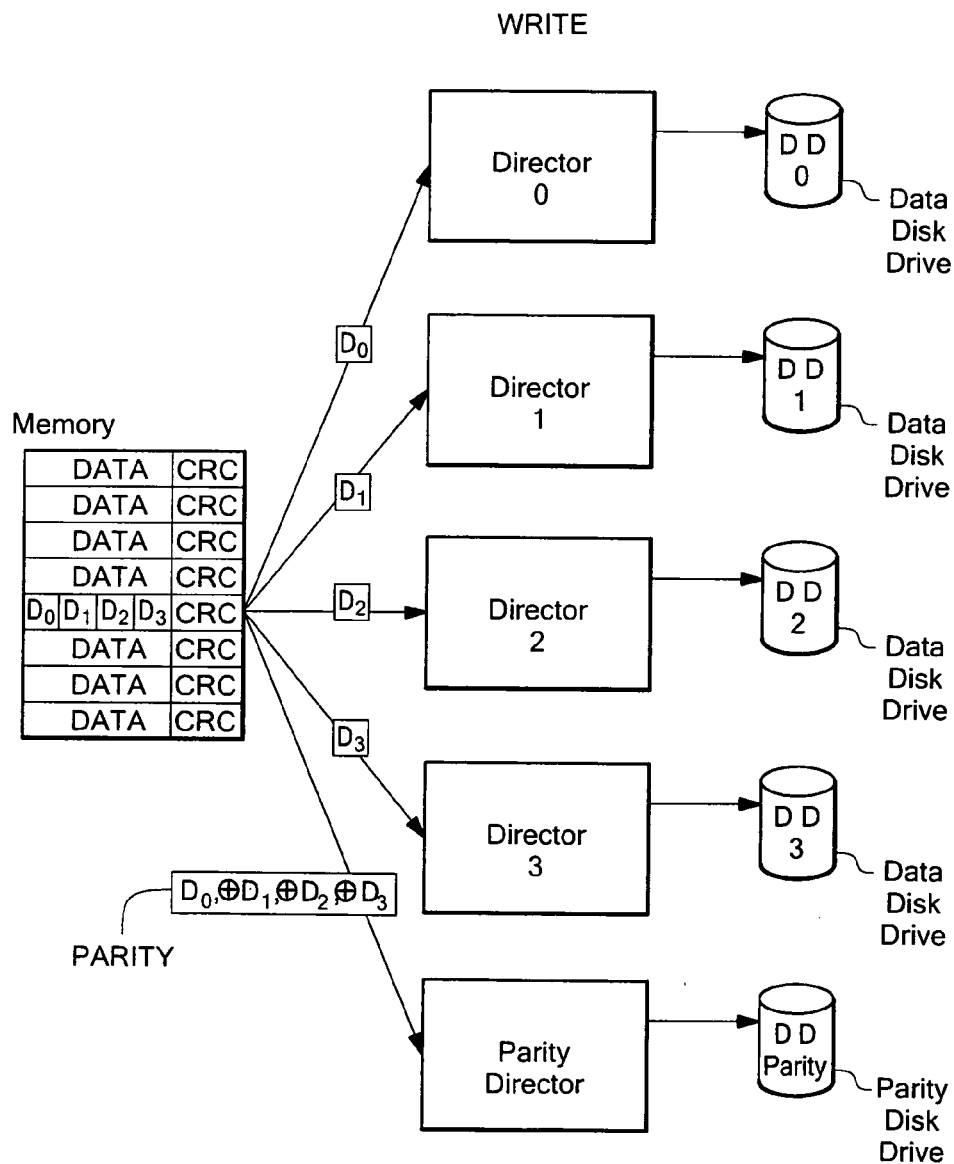
FIGS. 1A and 1B are diagrams showing storage and retrieval, respectively, of data from disk drives of a RAID system in accordance with the PRIOR ART.
Figure 1B:
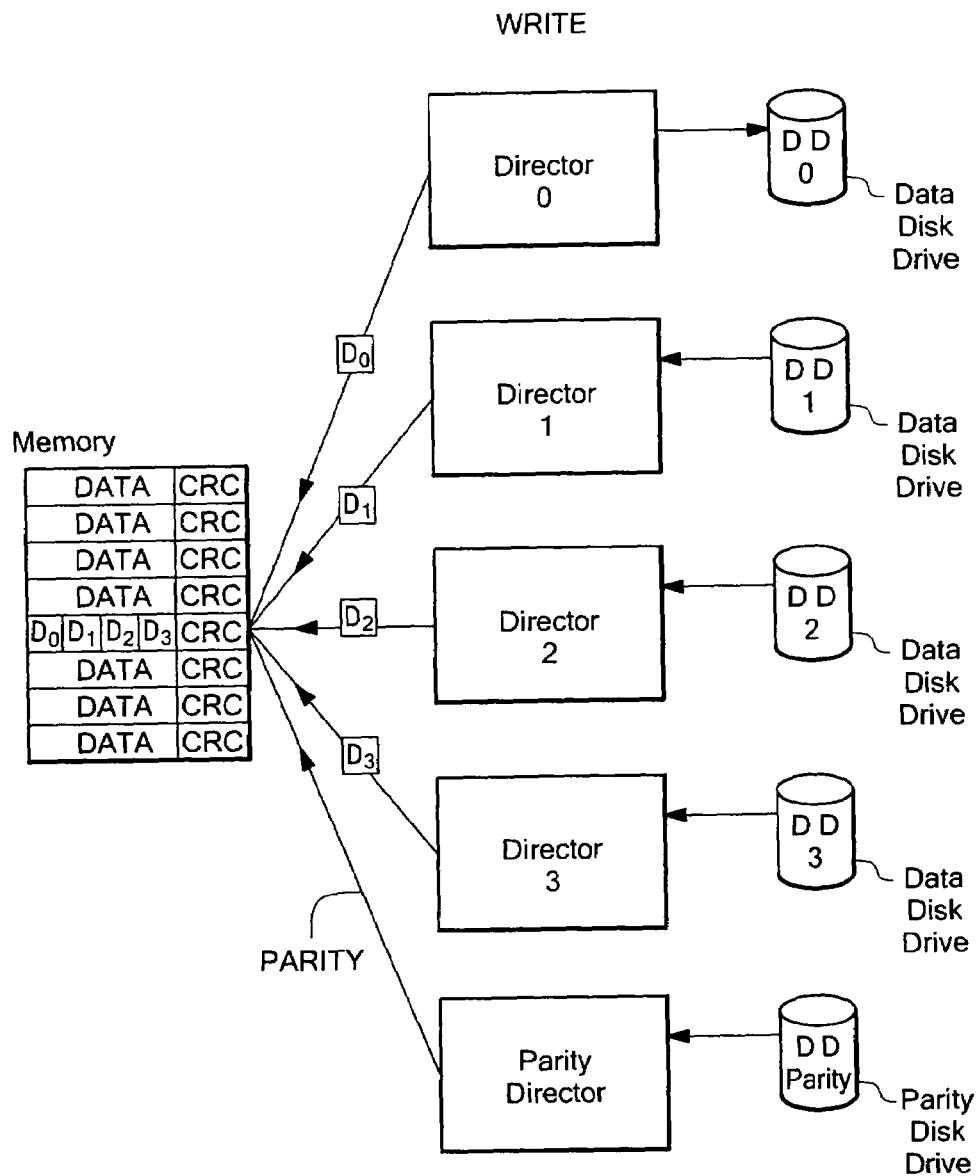
Figure 2A:
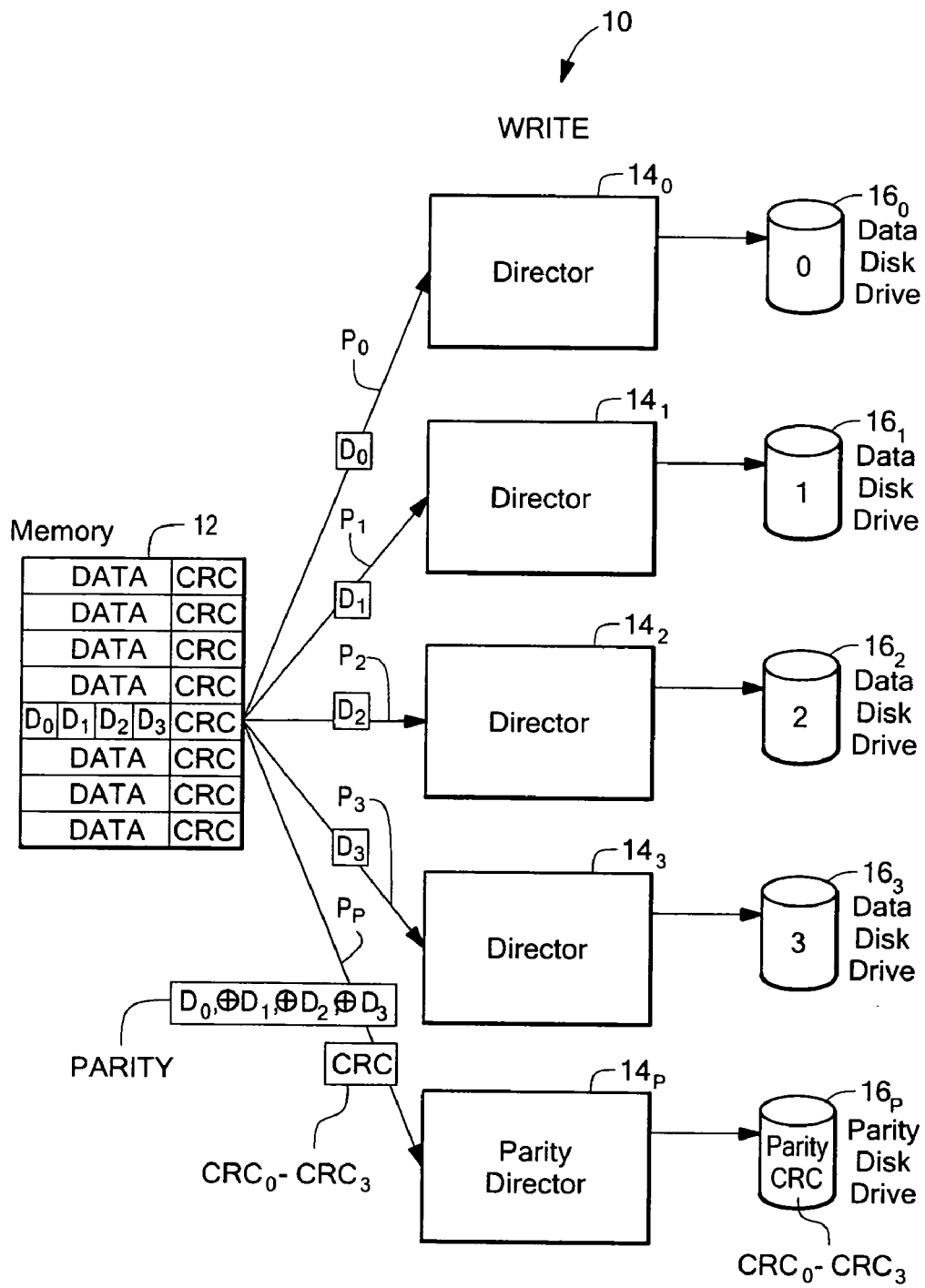
FIG. 2A is a diagram showing storage of data into disk drives of a RAID system in accordance with the invention.

Referring now to FIG. 2A, a RAID system 10 is shown to include a semiconductor memory 12 in communication with a plurality of, here four data disk drives $16_0$–$16_4$ and a parity disk drive $16_P$ through a plurality of data directors $14_0$–$14_4$ and a parity director $14_P$, respectively, as shown.

Here, the memory 12 stores at one location thereof four blocks of data, i.e., D0–D3 and also stores a CRC for each one of the blocks of data. Thus, data block D0 has an associated CRC0, data block D1 has an associated CRC1, data block D2 has an associated CRC2, and data block D3 has an associated CRC3.

Figure 2B:
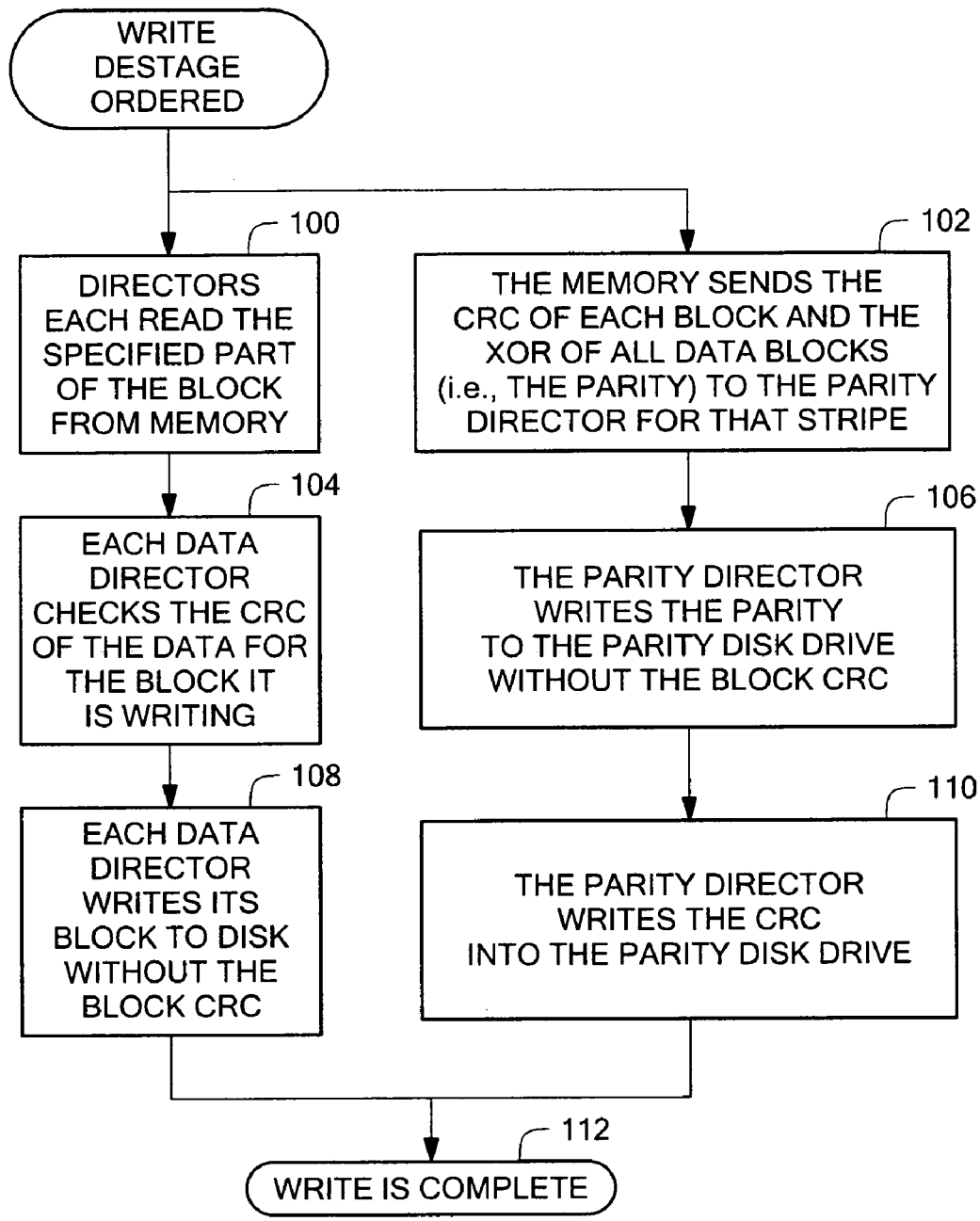
FIG. 2B is a diagram showing retrieval of data from the disk drives of the RAID system of FIG. 2A in accordance with the invention.

Referring also to FIG. 2B, during a write operation to disk, the data directors $14_0$–$14_3$ each reads a specified part of the data from memory 12 (Step 100). Thus, here, data directors $14_0$–$14_3$ read data blocks D0–D3, respectively, as indicated in FIG. 2A. The data directors $14_0$–$14_3$ also calculate a CRC for the data block it receives. Thus data directors $14_0$–$14_3$ calculate CRC0'–CRC3', respectively.

In step 102, the memory 12 sends the CRCs (i.e., CRC0–CRC3) of each data blocks D0–D3, respectively, and the XOR of the data blocks D0–D3 (i.e., the parity of the data) to the parity director $14_P$, as indicated in FIG. 2A.

In step 104, each one of the data directors $14_0$–$14_3$ checks the CRC of the data block it receives, i.e., CRC0–CRC3, respectively, against the calculated CRCs (i.e., CRC0'–CRC3', respectively). If there is a CRC error, the data write transfer is reinitiated; otherwise the transfer process continues.

In step 106, the parity director $16_P$ writes the parity into the disk drive $16_P$.

In step 108, each one of the data directors $16_0$–$16_3$ writes its data block D0–D3, respectively, to its coupled disk drive $16_0$–$16_3$, respectively without the block CRC. Thus, the CRCs are not stored on the data disk drives $16_0$–$16_3$.

In step 110, the parity director $14_P$ writes the CRCs, i.e., CRC0–CRC3 read from the memory 12, into the parity disk drive $16_P$ thereby completing the write, step 112.

It should be noted that the CRCs stored in memory 12 need not be stored in the parity disk drive $16_P$ but rather may be stored in a memory within the parity director $14_P$.

Thus, from the foregoing, it is noted that the method includes: transmitting the blocks of data, here D0–D3, from a source thereof, here memory 12, for storage in the disk drives, here $16_0$–$16_3$, through a plurality of different transmission paths, (i.e., $P_0$–$P_3$ in FIG. 2A) and transmitting CRCs (i.e., CRC0–CRC3) associated with each one of the blocks of data for storage in a storage medium, here disk dive $16_P$, or a memory within the parity director $16_P$, through a path (i.e., $P_P$ in FIG. 2A) separate the plurality of different transmission paths, (i.e., $P_0$–$P_3$ in FIG. 2A).

Figure 3A:
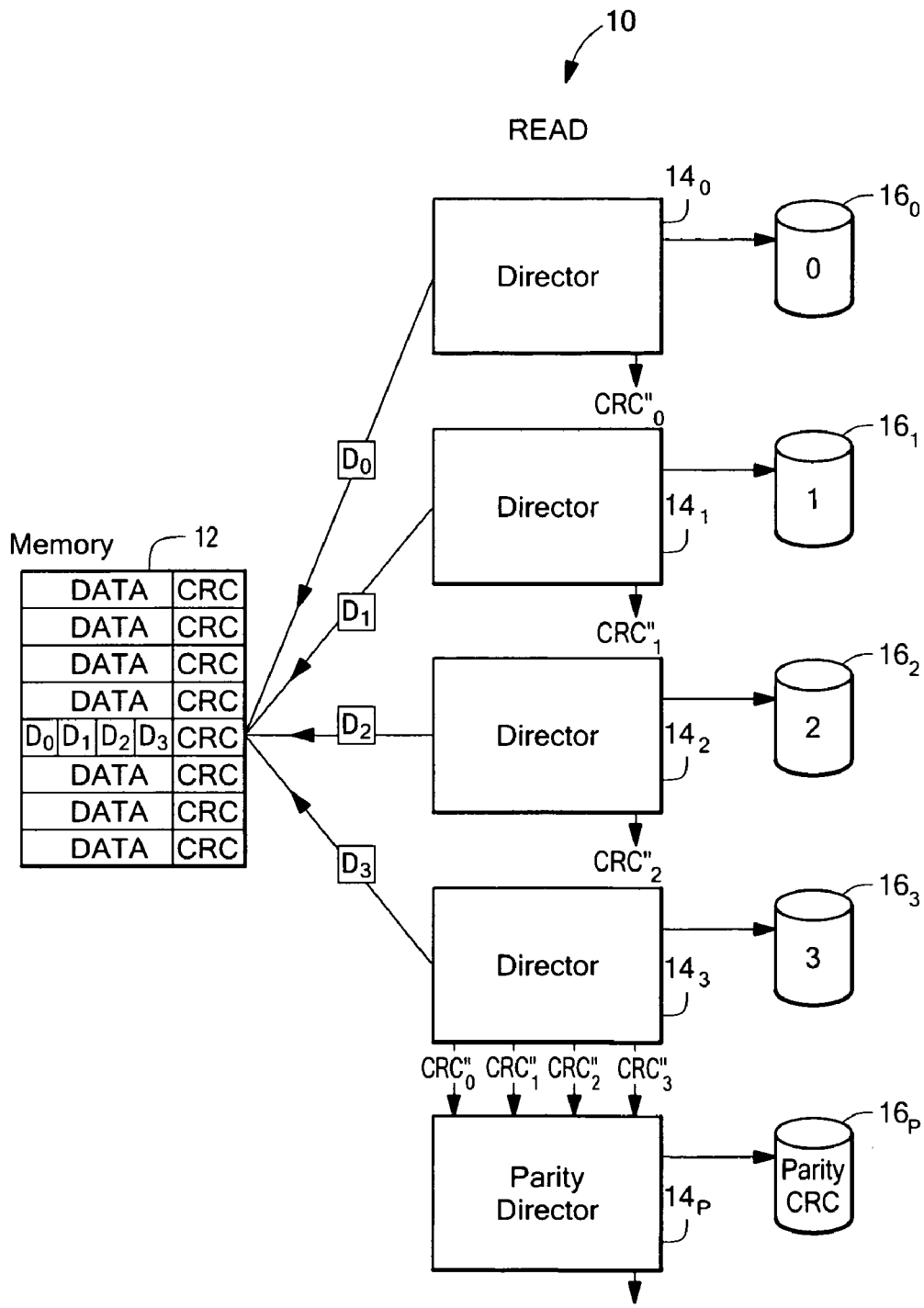
FIG. 3A is a flow diagram of the method showing storage of data into the disk drives of the RAID system of FIG. 2A in accordance with the invention.
Figure 3B:
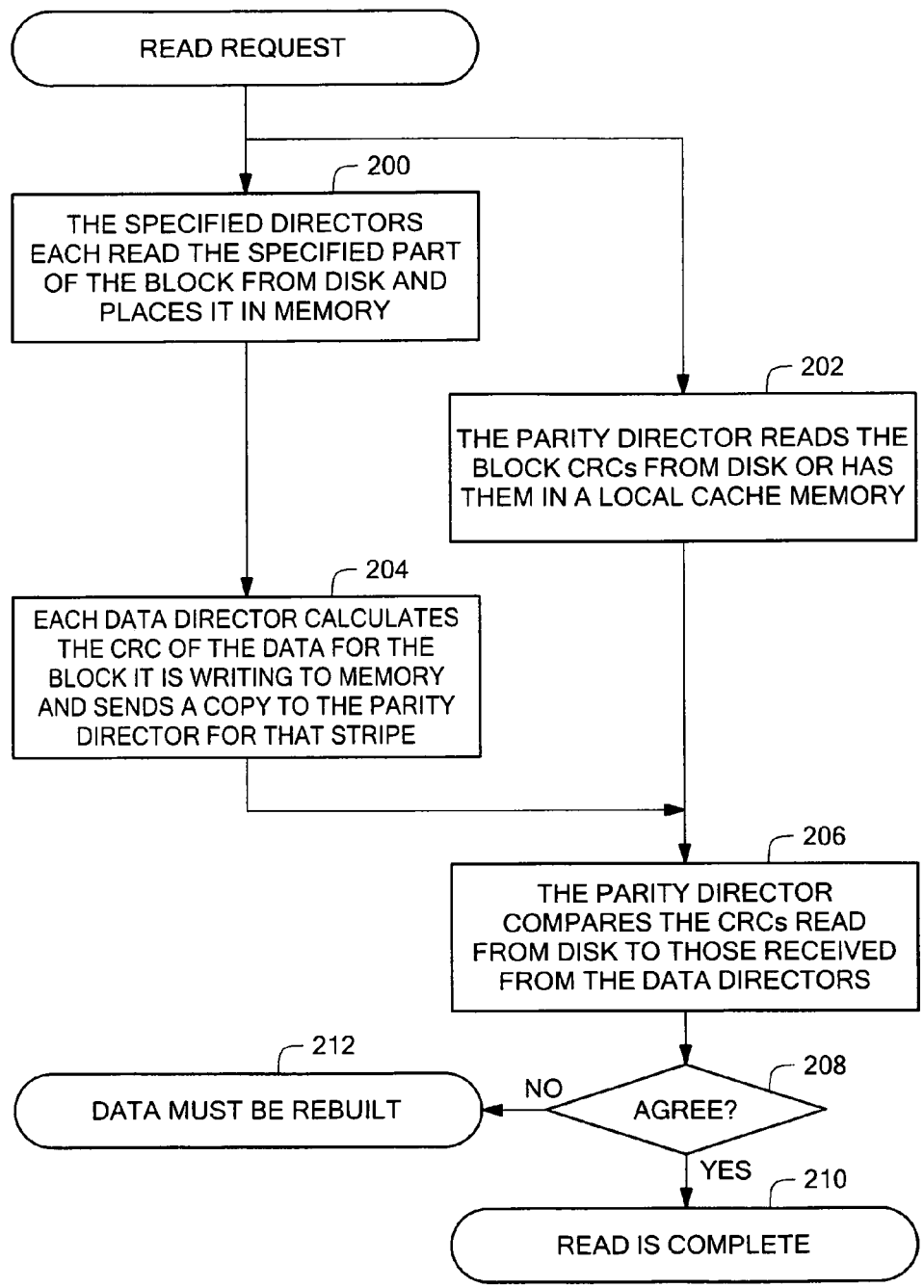
FIG. 3B is a flow diagram of the method showing retrieval of data from the disk drives of the RAID system of FIG. 2A in accordance with the invention.

Referring now to FIGS. 3A and 3B, the read operation will be described. In step 200, the data directors $14_0$–$14_3$ each read the data blocks $D_0$–$D_3$, respectively, stored in the data disk drives $14_0$–$14_3$, respectively and places it in a memory, not shown, within such data directors $14_0$–$14_3$, respectively.

In step 202, the parity director $16_P$ reads the block CRCs (i.e., CRC0–CRC3) from the parity disk drive $16_P$ (or from a memory, not shown, in such parity director $16_P$).

In step 204, each one of the data directors $14_0$–$14_3$ calculates the CRC of the data block D0–D3, respectively, i.e., CRC0"–CRC3" as shown in FIG. 3A, and sends a copy of it to the parity director $16_P$, as shown in FIG. 3A.

In step 206, the parity director $14_P$ compares the CRCs read from the parity disk drove $16_P$ (or from a memory, not shown, in such parity director $16_P$) (i.e., the CRCs: CRC0–CRC3) with the CRCs, i.e., CRC0"–CRC3", sent to it by the data disk drives $14_0$–$14_3$, respectively.

If, in step 208, the CRCs: CRC0–CRC3 read from the parity disk drove $16_P$ (or from a memory, not shown, in such parity director $16_P$) agree with the CRCs: CRC0"–CRC3" sent to it by the data disk drives $14_0$–$14_3$, respectively, the read is complete, step 210; otherwise, the data must be rebuilt, step 212.

A number of embodiments of the invention have been described. Nevertheless, it will be understood that various modifications may be made without departing from the spirit and scope of the invention. For example, it should be understood that the parity disk may be rotated as in any RAID V system. Accordingly, other embodiments are within the scope of the following claims.

What is claimed is:

1. A method for storing data and checking the validity of stored data when such stored data is read, comprising:
    transmitting the data from a source thereof, such data having a Cyclic Redundancy Code (CRC) for storage in a first storage device and transmitting the CRC and together with parity for storage in a second, different storage device;
    retrieving the data stored in the first storage device;
    determining a CRC associated with the retrieved data; and
    comparing the determined CRC with the CRC stored in the second storage device.

2. The method recited in claim 1 wherein the first storage device is a disk drive.

3. A method for storing data on a disk drive and checking the validity of data read from such disk drive, comprising:
    transmitting the data from a source thereof for storage in the disk drive and transmitting a Cyclic Redundancy Code (CRC) together with parity associated with such data for storage in a different disk drive:
    retrieving the data stored on the disk drive;
    determining a CRC associated with the retrieved data; and
    comparing the determined CRC with the CRC stored in a second disk drive.

4. The method recited in claim 3 wherein the second disk drive is a parity disk drive.

5. A method for storing data on a disk drive and checking the validity of data read from such disk drive, comprising:
    transmitting the data from a source thereof for storage in the disk drive through a first transmission path and transmitting a Cyclic Redundancy Code (CRC) together with parity associated with such data for storage in a storage medium through a second path separate from the disk drive;
    retrieving the data stored on the disk drive;
    determining a CRC associated with the retrieved data; and
    comparing the determined CRC with the CRC stored in the storage medium.

6. The method recited in claim 5 wherein the storage medium is a second disk drive.

7. The method recited in claim 6 wherein the second disk drive is a parity disk drive for storing a parity of the data transmitted by the source to the disk drive.

8. A method for storing a plurality of blocks of data on a corresponding one of a plurality of disk and checking the validity of plurality of blocks of data read from such disk drives, comprising:

transmitting the blocks of data from a source thereof for storage in the disk drives through a plurality of different transmission paths and transmitting Cyclic Redundancy Codes (-CRCs) together with parity associated with each one of the blocks of data for storage in a storage medium through a path separate the plurality of different transmission paths;

retrieving the blocks of data stored in the disk drives;

determining CRCs associated with the blocks of retrieved data; and comparing the determined CRCs with the CRCs stored on the storage medium.

9. The method recited in claim 8 wherein the storage medium is a second disk drive.

10. The method recited in claim 9 wherein the second disk drive is a parity disk drive for storing a parity of the data transmitted by the source to the disk drive.

11. A method for storing a stripe of data comprising a plurality of data blocks, each one of the plurality of blocks of data being stored on a corresponding one of a plurality of disk drives, such stripe of data having a data protection code, each one of the blocks of data having a parity, and checking the validity of the stripe of data read from such plurality of disk drives, comprising:

transmitting each one of the plurality of blocks of data, together with an associated data protection code, from a source of such blocks of data for storage in a corresponding one of the plurality of disk drives through a corresponding one of a plurality of different data directors, each one of the data directors writing the block of data transmitted thereto into the corresponding one of the plurality of disk drives;

transmitting a parity associated with the plurality of blocks of data and a data protection code associated with each one of the blocks of data in the source for storage in a separate storage medium through a parity director separate from the plurality of data directors;

retrieving each one of the plurality of blocks of data stored in each one of the plurality of disk drives for the corresponding one of the plurality of data directors;

determining from each one of the plurality of data directors a data protection code associated with each one of the retrieved blocks of data;

comparing the determined data protection codes with the data protection codes stored in the separate storage medium; and determining from such comparison, whether to rebuild the stripe of data.

12. A method for storing a stripe of data comprising a plurality of data blocks, each one of the plurality of blocks of data being stored on a corresponding one of a plurality of disk drives, such stripe of data having a data protection code, each one of the blocks of data having a parity, and checking the validity of the stripe of data read from such plurality of disk drives, comprising:

transmitting each one of the plurality of blocks of data from a source of such blocks of data for storage in a corresponding one of the plurality of disk drives through a corresponding one of a plurality of different data directors, each one of the data directors writing the blocks of data transmitted thereto into the corresponding one of the plurality of disk drives;

transmitting parity associated with the plurality of blocks of data and a data protection code associated with each one of the blocks of data in the source for storage in a separate storage medium through a parity director separate from the plurality of data directors;

retrieving each one of the plurality of blocks of data stored in each one of the plurality of disk drives for the corresponding one of the plurality of data directors;

determining from each one of the plurality of data directors a data protection code associated with each one of the retrieved blocks of data;

comparing determined data protection codes with the data protection codes stored in the separate storage medium; and determining from such comparison, whether to rebuild the stripe of data.

* * * * *